United States Patent Office 2,917,518
Patented Dec. 15, 1959

2,917,518

ACID PASTING OF METAL-FREE PHTHALOCYANINE

Richard Raymond Merner, Avondale, Pa., assignor to E. I. du Pont de Nemours and Company, Wilmington, Del., a corporation of Delaware No Drawing. Application July 14, 1958
Serial No. 748,119

3 Claims. (Cl. 260—314.5)

This invention relates to an improved process for acid pasting metal-free phthalocyanine. Acid pasting in the phthalocyanine art generally means dissolving the color in concentrated sulfuric acid and then reprecipitating the same by drowning the solution in water. The primary object of acid pasting is to convert the pigment from a coarsely crystalline form (so-called "crude" form) as it is usually obtained in the process of synthesis, into a fine pigmentary form, that is, a particle size which is adapted for use in pigments and which brings out in the latter a high tinctorial strength. Incidental effects generally obtained in acid pasting are chemical purification (i.e. removal of impurities which are soluble in dilute acid) and conversion of the beta crystalline form to the alpha form. These two forms are well known in the art and differ in their X-ray pattern. Further details on the standard acid pasting process, as applied to phthalocyanine pigments, may be found in Chemistry of Synthetic Dyes and Pigments (A.C.S. Monograph No. 127, edited by H. A. Lubs), page 587, and the references therein cited.

In the case of metal-free phthalocyanine, however, conventional acid pasting procedure has been found to be damaging to the brilliance, shade and tinctorial strength of the color. It has further been found that the results could be improved somewhat by reducing the time that the pigment is in contact with strong acid, by preparing and maintaining the strong-acid solution at ice temperatures, and by keeping down the drowning temperature.

I have now found that the economy of the acid pasting process can be immensely improved, and that metal-free phthalocyanine in the pigmentary state and of improved tinctorial qualities can be obtained, if the acid pasting is carried out under conditions which prevent contact between the acid pigment solution and atmospheric oxygen.

Accordingly, this invention comprises a procedure wherein the acid pasting of crude metal-free phthalocyanine is carried out under an atmosphere of nitrogen or other convenient inert gas free of oxygen or oxidizing gases (for instance, trichlorofluoromethane), so long as the pigment is in solution. After precipitation, the pigment may again be allowed to come in contact with the atmosphere.

For convenience, the solution of the color in the acid is effected in a closed vessel from which the atmosphere above the liquid phase is first swept out by a stream of nitrogen, which stream is continued at a mild rate throughout the period of stirring to dissolve the color. The acid solution, which no longer need be prepared or maintained at ice-cooled temperature, is then drowned in water. After drowning, the precipitated color, which is in the alpha crystalline form, is filtered off, washed acid-free, dried and pulverized (to crush any lumps formed during drying) in the usual manner, and is found to be in a high state of purity, which expresses itself by excellent tinctorial strength and brightness.

Without limiting this invention, the following examples are given to illustrate my preferred mode of operation. Parts mentioned are by weight.

*Example 1*

Into a closed glass vessel fitted with an agitator, thermometer, gas inlet tube and a vent tube leading to the atmosphere, there was added 480 parts of 98% sulfuric acid and 2 parts of technical dodecyl alcohol. A stream of dry nitrogen was started through the gas inlet tube so that it bubbled into the acid below the liquid surface. The rate of nitrogen feed was such that a volume of nitrogen equal to the space in the vessel not occupied by liquid was fed each 1 to 2 minutes. External cooling was applied and the temperature was reduced to 0° to 5° C. After the nitrogen had displaced substantially all the air from inside the vessel, 40 parts of coarse metal-free phthalocyanine (as obtained directly in the synthesis thereof according to Example 1 of U.S. Patent 2,485,167) were added in small portions during 1 to 2 hours. The temperature was maintained at 0° to 5° C. and the stream of nitrogen was continued all during the addition and for 1 to 1.5 hours afterward. At the end of this time the pigment had completely dissolved in the acid. The pigment was precipitated by adding the solution to a large volume of water (about 5000 to 10,000 parts). The color was separated by filtration and washed with water to remove the dilute acid. The filter cake was added to 900 parts of 2% aqueous sodium hydroxide. The slurry was heated to 90° C. and agitated at 90° to 95° C. for 1 hour, then filtered. The filter cake was washed with water until free from alkali, then dried at 100° C. and pulverized to give an excellent yield of product. When tested in lithographic varnish, the product was found to be noticeably greener, very much brighter and between 5% and 10% stronger than a control sample which was acid pasted by the same procedure except that an atmosphere of air was present throughout the operation.

*Example 2*

Example 1 was repeated except that the solution of metal-free phthalocyanine in the acid was agitated under a nitrogen atmosphere at 0° to 5° C. for 20 hours before drowning into water. The product after working up by the procedure of Example 1 was tested in lithographic varnish, and found to be considerably greener, very much brighter and 5% to 10% stronger than a control in which the acid-pasting was done in the presence of air, and the solution was drowned into water as soon as the color was all in solution.

The results of the above experiment are remarkable, inasmuch as when air is allowed to come in contact with the solution of metal-free phthalocyanine in sulfuric acid, the deterioration (dullness and weakness) of the product is generally greater the longer the period of stirring between complete solution and drowning.

*Example 3*

Example 1 was repeated except that a temperature of 20° to 25° C. was used during the steps of displacing the air from the vessel, adding and dissolving the pigment. The quality of the resulting product was substantially equal to that of Example 1.

*Example 4*

Example 1 was repeated except that the temperature was 15° to 20° C. and the nitrogen was fed in above the liquid surface. Results were substantially the same as from a control where the nitrogen was bubbled in under the surface of the acid.

*Example 5*

Fourteen parts of liquid trichlorofluoromethane were added to a closed glass vessel fitted with an agitator, thermometer and vent. The walls and bottom of the vessel were heated to 25° to 27° C. causing the trichlorofluoromethane to boil and displace the air from the vessel. Then 480 parts of 98% sulfuric acid and 2 parts of technical dodecyl alcohol were added. Forty parts of coarse metal-free phthalocyanine were then added in small increments during 1 to 2 hours while maintaining the temperature at 25° to 27° C. An additional ten parts of trichlorofluoromethane were added at a uniform rate during the addition of the pigment and the agitation period. The metal-free phthalocyanine was precipitated by adding the solution to a large volume of water. After working up by the same procedure as in Example 1 there was obtained an excellent yield of finished color which, when tested in lithographic varnish, was bright in shade and of good tinctorial strength.

The details of the above examples may be varied widely within the skill of those engaged in this art. Thus, dodecyl alcohol has been added to the sulfuric acid mass to act as special assistant, in accordance with U.S. Patent No. 2,291,452. This assistant, however, may be dispensed with, or other assistants, per se known in the art, may be added.

The amount of sulfuric acid employed may be varied within wide limits, the rule being to use sufficient acid to achieve complete solution of the color in a reasonable or convenient length of time. 10 to 12 parts by weight of the acid per weight of the pigment may be taken as a convenient rule. The concentration of the acid may vary from 96 to 100%, with the preferred value at about 98% (±0.5%).

My improved process works well whether the strong-acid solution is prepared at low temperatures (say 0° to 5° C.) or at room, as well as at higher than room, temperatures. But inasmuch as cooling involves additional expense, while heating may create a hazard in drowning, it is preferred to operate at ambient temperature. In an open plant, this temperature may vary from about 0° to 5° C. in the winter to about 27° to 30° C. in the summer.

In the drowning step, the temperature of the water may be allowed to rise as high as 60° to 80° C. Temperatures much higher than 80° C. may bring in the hazard of explosive boiling. The drowning may be carried out in special apparatus, such as a high-turbulence tube, or simply by pouring the acid solution of the pigment gently into water, with agitation.

The advantages of my invention are far more significant than would appear off hand from a mere shift in brilliance and tinctorial strength. My improvement amounts in effect to the conversion of a hitherto high-priced, weak and dull pigment of little sales interest into a fair-priced, strong, bright and saleable product, useful as a pigment for inks and for coloring paper, textiles and the like.

I claim as my invention:

1. In the acid-pasting of metal-free phthalocyanine by dissolving the color in concentrated sulfuric acid and drowning the resulting solution in water, the improvement which consists of maintaining in contact with said solution of pigment an atmosphere free of oxidizing gases, at all stages prior to drowning.

2. A process of producing metal-free phthalocyanine in fine physical form, which comprises dissolving crude metal-free phthalocyanine in sulfuric acid of 96 to 100% strength under an atmosphere of nitrogen, then drowning the solution in water and recovering the precipitated color.

3. A process as in claim 2, the sulfuric acid being of about 98% strength.

References Cited in the file of this patent

UNITED STATES PATENTS 2,176,011     Murch et al.  ------------ Oct. 10, 1939

OTHER REFERENCES

Dent et al.: Jour. Chem. Soc. (London), pp. 1033–38 (1934).

Cook: Jour. Chem. Soc. (London), pp. 1768–1774 (1938).

Linstead et al.: Jour. Chem. Soc. (London), p. 2981 (1950).

Chem. of Syn. Dyes and Pigments, Lubs, Reinhold Pub. Corp., New York (A.C.S. Monograph #127), p. 582 (1955).